United States Patent [19]

Salazar

[11] Patent Number: 4,855,402

[45] Date of Patent: Aug. 8, 1989

[54] SELF-EMULSIFIABLE RESIN POWDER

[75] Inventor: Mariano Salazar, Orsay, France

[73] Assignee: The Goodyear Tire & Rubber Company, Akron, Ohio

[21] Appl. No.: 207,418

[22] Filed: Jun. 16, 1988

Related U.S. Application Data

[60] Division of Ser. No. 52,927, May 22, 1987, Pat. No. 4,777,198, which is a continuation of Ser. No. 801,354, Nov. 25, 1985, abandoned.

[51] Int. Cl.$^4$ ............................................. C08F 6/00
[52] U.S. Cl. .................................... 528/487; 524/562
[58] Field of Search ............... 528/487; 524/556, 562, 524/156, 157, 166

[56] References Cited

U.S. PATENT DOCUMENTS

| | | | |
|---|---|---|---|
| 3,232,899 | 2/1966 | Guziak | 260/29.6 |
| 3,781,236 | 12/1973 | Bassham | 524/156 |
| 4,310,593 | 1/1982 | Gross | 526/317.1 |
| 4,522,972 | 7/1982 | Mondt | 524/548 |
| 4,536,528 | 8/1985 | George, Jr. | 524/313 |

FOREIGN PATENT DOCUMENTS 2445813 4/1976 Fed. Rep. of Germany .
883939 7/1943 France .

*Primary Examiner*—Christopher Henderson
*Attorney, Agent, or Firm*—Alvin T. Rockhill

[57] ABSTRACT

A self-emulsifiable resin powder can be dispersed in water without utilizing additional surfactants or expending large amounts of mechanical energy. Such self-emulsifiable resin powders offer numerous distinct advantages over conventional latices. One of the most important benefits that is realized by utilizing self-emulsifiable resin powders is that they can be shipped dry which is the equivalent to shipping a latex with a 100 percent solids content. In other words, such self-emulsifiable resin powders eliminate the necessity for shipping water in latices. The self-emulsifiable resin powders disclosed herein also have the advantage of having low carboxyl contents and of being dispersible into aqueous systems which contain virtually no surfactants. These self-emulsifiable resins contain a relatively small proportion of repeat units which are derived from both acrylic acid and methacrylic acid. The self-emulsifiable resin powder compositions disclosed herein also contain a small amount of a metal salt of an alkyl sulfonate or a metal salt of an alkyl sulfate.

1 Claim, No Drawings

SELF-EMULSIFIABLE RESIN POWDER

This is a divisional of application Ser. No. 52,927 filed on May 22, 1987, now U.S. Pat. No. 4,777,198, which is a continuation of application Ser. No. 801,354, filed on Nov. 25, 1985, now abandoned.

BACKGROUND OF THE INVENTION

A synthetic latex is an aqueous dispersion of finally divided polymer particles or spheres. Such dispersions are conventionally stabilized by a surfactant or emulsifying agent and are generally stable for a period of months or even years. Such lateices are generally comprised of from 20 percent to 70 percent solids and from 30 percent to 80 percent water. Even though such latices are utilized as aqueous dispersions, it is nevertheless burdensome and costly to ship such large amounts of water. For this reason it would be highly desirable to provide a resin which is a dry powder for storage and transportation purposes, but which can be reconstituted to a latex for ultimate use, in a paint, an adhesive composition, a carpet backing, a paper coating, or the like.

Redispersible powders have previously been prepared. However, the copolymers utilized in these redispersible powders generally have high acid contents (they contain a relatively large number of repeat units that are derived from monomers which contain carboxyl groups). Such redispersible powders have also been known to contain relatively large amounts of surfactants. More specifically, see *The Journal of Applied Polymer Science,* pp. 2249–2258 (1963) and U.S. Pat. No. 3,232,899. The utilization of high acid contents and the presence of large amounts of surfactants generally has an adverse effect on the performance of latices. For this reason heretofore a totally satisfactory redispersible resin powder composition has not been prepared.

SUMMARY OF THE INVENTION

The present invention is based on the unexpected discovery that terpolymers which contain both repeat units derived from acrylic acid and repeat units which are derived from methacrylic acid are dispersible into aqueous systems which contain a small amount of a metal salt of an alkyl sulfonate or a metal salt of an alkyl sulfate, without the necessity of utilizing additional surfactants. More specifically, the present invention reveals a self-emulsifiable resin powder composition comprising:
(a) a terpolymer comprised of repeat units derived from (1) about 0.1 to 6 weight percent acrylic acid, (2) about 0.1 to 4 weight percent methacrylic acid, and (3) about 93 to 99 weight percent copolymerizable monomers, with the proviso that the total amount of repeat units derived from acrylic acid, methacrylic acid, and other carboxyl group containing monomers in said terpolymer does not exceed about 7 weight percent, said weight percentages being based upon the total weight of said terpolymer; and
(b) from 0.005 to 1 weight percent, based upon the total weight of said powder composition, of at least one member selected from the group consisting of metal salts of alkyl sulfonates and metal salts of alkyl sulfates.

The present invention also discloses a process for making a self-emulsifiable resin powder composition comprising:
(a) polymerizing from about 0.1 to 6 phm acrylic acid, from about 0.1 to 4 phm methacrylic acid, and from about 93 to 99 phm copolymerizable monomers in an aqueous medium in the presence of from about 0.005 to 1 phm of at least one member selected from the group consisting of metal salts of alkyl sulfonates and metal salts of alkyl sulfates, to form a terpolymer emulsion with the proviso that no more than a total of 7 phm of acrylic acid, methacrylic acid, and other carboxyl group containing monomers is polymerized into the terpolymer: and
(b) drying said terpolymer emulsion to form a self-emulsifiable resin powder composition.

The present invention further reveals a process for dispersing such self-emulsifiable resin powder compositions in water comprising:
(a) adjusting the pH of said water to greater than 7, and
(b) mixing said self-emulsifiable resin powder composition into the water to form a dispersion wherein said self-emulsifiable resin powder composition is comprised of (1) a terpolymer comprised of repeat units derived from about 0.1 to 6 weight percent acrylic acid, from about 0.1 to 4 weight percent methacrylic acid, and from about 93 to 99 weight percent copolymerizable monomers with the proviso that the total amount of repeat units derived from acrylic acid, methacrylic acid, and other carboxyl group containing monomers in said terpolymer does not exceed 7 weight percent, said weight percentages being based upon the total weight of said terpolymer, and (2) from about 0.005 to 1 weight percent, based upon the total weight of said powder composition, of at least one member selected from the group consisting of metal salts of alkyl sulfonates and metal salts of alkyl sulfates.

DETAILED DESCRIPTION OF THE INVENTION

The terpolymers utilized in the self-emulsifiable resin powders of the present invention are synthesized utilizing a free radical polymerization technique in an aqueous medium. These terpolymers are comprised of repeat units which are derived from three or more different monomers. Two of the monomers that are utilized in the preparation of these terpolymers are acrylic acid and methacrylic acid. In addition to the acrylic acid and methacrylic acid monomers, one or more additional copolymerizable monomers are also utilized in the preparation of the terpolymer. In other words, the terpolymers utilized in the powder compositions of the present invention are comprised of repeat units derived from (1) acrylic acid, (2) methacrylic acid, and (3) at least one copolymerizable monomer. The term "copolymerizable monomer" as used herein means any monomer that can be copolymerized with acrylic acid and methacrylic acid. In cases where more than one copolymerizable monomer are utilized it is, of course, necessary for the copolymerizable monomers to be capable of being copolymerized together.

These terpolymers will normally contain (1) from about 0.1 to 6 weight percent acrylic acid, (2) from about 0.1 to 4 weight percent methaerylic acid, and (3) from about 93 to 99 weight percent copolymerizable monomers. Technically, these terpolymers contain repeat units (chain linkages) which are derived from acrylic acid monomers, methacrylic acid monomers, and one or more copolymerizable monomers. These repeat units differ from the monomers that they were derived from in that they contain one less carbon-carbon double bond than is present in the monomer. In other words, an carbon-carbon double bond is consumed during the polymerization of the monomer into a repeat unit in the polymer. Thus, in saying that a polymer contains various monomers in actuality means that it contains repeat units derived from those monomers.

Preferably the terpolymers utilized in the present invention will have from 0.5 to 4 weight percent of their repeat units being derived from acrylic acid and from 0.5 to 3 weight percent of their repeat units being derived from methacrylic acid. In any case no more than 7 weight percent of the repeat units in the terpolymer can be derived from acrylic acid, methacrylic acid, and other carboxyl group containing monomers. Preferably no more than 5 weight percent of the repeat units in said terpolymers will be derived from acrylic acid, methacrylic acid, and other carboxyl group containing monomers. Most preferably from 2 to 4 weight percent of the repeat units in such terpolymers will be derived from acrylic acid and methacrylic acid monomers. Generally the only repeat units in such terpolymers that contain carboxyl groups are the repeat units which are derived from the acrylic acid and the methacrylic acid monomers. In other words, normally acrylic acid and methacrylic acid are the only carboxyl group containing monomers that are utilized in the preparation of the terpolymers utilized in the present invention.

The terpolymers of the present invention are synthesized in an aqueous reaction mixture by utilizing a free radical polymerization technique. The reaction mixture utilized in this polymerization technique is comprised of water, the appropriate monomers, a suitable initiator, and a metal salt of an alkyl sulfate or a metal salt of an alkyl sulfonate. The reaction mixture utilized in this polymerization technique will normally contain from about 10 to about 80 weight percent monomers, based upon the total weight of the reaction mixture. The reaction mixture will preferably contain from 20 to 70 weight percent monomers and will most preferably contain from 40 to 50 weight percent monomers. The reaction mixtures utilized in carrying out such polymerizations also contain from about 0.005 to 1 phm (parts per hundred parts of monomer by weight) of at least one member selected from the group consisting of metal salts of alkyl sulfates and metal salts of alkyl sulfonates. Preferably from 0.008 to 0.3 phm and most preferably from 0.01 to 0.1 phm of a metal salt of an alkyl sulfonate and/or a metal salt of an alkyl sulfate will be utilized in the reaction mixture. The free radical polymerization technique utilized in this synthesis is normally initiated by including a free radical initiator in the reaction mixture. The utilization of a metal persulfate or ammonium persulfate as the initiator works well with potassium persulfate, sodium persulfate, and ammonium persulfate being highly suitable as the initiator.

The subject polymerization can be carried out in a batch process, on a semi-continuous basis, or in a continuous process. The polymerization temperature that can be used varies greatly with the type of initiator being employed and with the copolymerizable monomers that are being polymerized. As a general rule the polymerization temperature utilized is from 20° C. to 95° C. In most cases the polymerization temperature utilized will vary between 60° C. and 80° C. Normally, the polymerization will be continued until a high monomer conversion is attained. The terpolymer emulsion that is produced by this process is therefore comprised of the terpolymer, water, and at least one member selected from the group consisting of metal salts of alkyl sulfonates and metal salts of alkyl sulfates.

The amount of initiator employed will vary with the monomers being polymerized and with the desired molecular weight of the terpolymer. However, as a general rule from 0.005 to 1 phm of an initiator will be included in the reaction mixture. In the case of metal persulfate initiators most commonly from 0.1 to 0.5 phm will be utilized. The metal salts of alkyl sulfates and metal salts of alkyl sulfonates that are utilized in the practice of the present invention will generally contain from 1 to 30 carbon atoms in their alkyl group. Preferably these salts will have alkyl groups that contain from 8 to 18 carbon atoms and most preferably they will have alkyl groups that contain from 10 to 14 carbon atoms. Sodium lauryl sulfate (dodecyl sodium sulfate) is a highly preferred metal salt of an alkyl sulfate.

The copolymerizable monomers that are utilized in the terpolymers of this invention are selected with the ultimate use of the particular latex being synthesized in mind. Most commonly the copolymerizable monomers utilized will be vinylaromatic monomers, acrylate monomers, alkyl acrylate monomers, and/or diene monomers. The vinyl monomers that can be employed will contain at least one vinyl group (CH$_2$=CH—). These vinyl monomers generally contain from 2 to 16 carbon atoms. Such vinyl monomers can also contain nitrogen, oxygen and/or halogen. Some representative examples of vinylaromatic monomers that can be used include styrene, orthomethylstyrene, metamethylstyrene, paramethylstyrene, ethylstyrene, dimethylstyrene, α-methylstyrene, parachlorostyrene, paramethoxystyrene, parachlorostyrene, 2,4-dichlorostyrene, 2,5-dichlorostyrene, parabromostyrene, α-methyl-paramethylstyrene, metaethylstyrene, paraisopropylstyrene, vinylnaphthalene, and the like. The alkyl acrylate monomers that can be utilized have the structural formula:

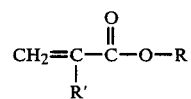

wherein R represents an alkyl group which contains from 1 to 20 carbon atoms and wherein R' represents a methyl group or a hydrogen atom. Preferably the alkyl group in such alkyl acrylate monomers will contain from 1 to 12 carbon atoms. Some representative examples of alkyl acrylate monomers that can be utilized include ethylacrylate, propylacrylate, butylacrylate, 2-ethylhexylacrylate, n-octylacrylate, ethylmethacrylate, propylmethacrylate, butylmethacrylate, 2-ethylhexylmethacrylate, n-octylmethacrylate, and the like. The diene monomers that can be utilized normally contain from 4 to about 12 carbon atoms. Either conjugated diene monomers or nonconjugated diene monomers can be utilized. Some representative examples of conjugated diene monomers that can be utilized include isoprene, 1,3-butadiene, piperylene, 1,4-hexadiene, 1,3-heptadiene, 1,3-octadiene, 2,4-hexadiene, 2,4-heptadiene, 2,4-octadiene, 2,3-dimethylbutadiene, 2,3-dimethyl-1,3-hexadiene, 2,3-dimethyl-1,3-heptadiene, 2,3-dimethyl-1,3-octadiene, 2,3-dimethyl-1,3-nonadiene, and the like.

The terpolymers that are used in latices which are used in making surface coatings or paints will preferably be hard resins and have a glass transition temperature of at least 40° C. The copolymerizable monomers used in making such terpolymers will be selected with these properties being kept in mind. For example, alkyl methacrylate monomers can be copolymerized into terpolymers in order to increase the glass transition temperature of the terpolymer. On the other hand, use can be made of the ability of alkyl acrylate monomers to plasticize or lower the glass transition temperature of such terpolymers. In other words, by a judicious choice of alkyl acrylate monomers, alkyl methacrylate monomers or mixtures thereof the desired glass transition temperature can be obtained.

A terpolymer resin that has good properties for utilization in coatings can be synthesized utilizing as the monomers 43 to 89 weight percent vinylaromatic monomers, 10 to 50 weight percent alkyl acrylate monomers, 0.5 to 4 weight percent acrylic acid, and 0.5 to 3 weight percent methacrylic acid. It is preferable to utilize from 55 to 78 weight percent vinylaromatic monomers, from 20 to 40 weight percent alkyl acrylate monomers, from 1 to 3 weight percent acrylic acid, and from 0.5 to 2 weight percent methacrylic acid in such resins. A preferred vinylaromatic monomer for use in such resins is styrene and the preferred alkyl acrylates are those which have alkyl groups containing from 2 to 6 carbon atoms. Butylacrylate is a highly preferred alkyl acrylate for use in such applications. All acrylic resins can be made by sutstituting methyl methacrylate for the vinylaromatic monomer (styrene) without substantially changing the glass transition temperature of the resulting resin.

The self-emulsifiable resin powder compositions of the present invention can be prepared by simply spray drying a terpolymer emulsion which was made in accordance with the present invention. This spray drying process can be carried out by utilizing conventional equipment which is readily commercially available and techniques which are well known to persons skilled in the art. The self-emulsifiable resin powder compositions which are made in this manner can then be redispersed in water by simply adjusting the pH of the water to above 7 and mixing the resin powder into it with only mild agitation being required. The pH of the water can be adjusted to above 7 by adding to it an organic or inorganic base, such as ammonium hydroxide, sodium hydroxide, potassium hydroxide, monoethanolamine, or the like. A fugitive base is preferred. The pH of the water will most commonly be adjusted to a pH of between 8 and 10.

The reconstituted latices made in accordance with this invention can then be utilized in many applications. For instance, they could be used in making surface coatings, paints, and concrete (cement) additives. It is, of course, also possible to use the latices of the present invention in such applications without first drying them into a powder form followed by reconstituting them to latex form by adding water.

Surface coating compositions or paints made by utilizing the reconstituted latices of the present invention will quite commonly be comprised of (a) the terpolymer resin; (b) water; (c) a coalescing agent; (d) a plasticizer; and (e) optionally a wetting or dispersing agent. In general, the use of wetting or dispersing agents is not required since the reconstituted latex acts as a dispersing agent by itself. Such surface coatings or paints will also commonly contain a pigment in order to provide the desired color. The amount of coalescing agent and plasticizer needed in such surface coating compositions varies greatly with the type of terpolymer resin being utilized. More specifically, in surface coating compositions that utilize a terpolymer resin with a high glass transition temperature greater amounts of coalescing agents are required than if the terpolymer resin has a low glass transition temperature. In fact, if a terpolymer resin having a glass transition temperature of about 20° C. to about 25° C. is utilized, then it will probably not be necessary to include a coalescing agent in the surface coating composition. In any case, persons having skill in the art will be able to determine the amount of coalescing agent that is required in order for the surface coating composition to ensure that it provides a continuous film upon drying after application to a surface. Compounds that are designed to increase the open time or drying time of the surface coating composition are also commonly utilized in such compositions. The amount of pigment required to produce a desired color will vary greatly with the pigment or combination of pigments being utilized which in turn will influence the gloss and other properties of the final paint film. A typical paint composition can be comprised of 20 to 40 weight percent water, 20 to 40 weight percent of the terpolymer resin of the present invention, 5 to 10 weight percent of a coalescing agent, 1 to 4 weight percent of a plasticizer, and 15 to 35 weight percent of a pigment. Butyldiglycol is a coalescing agent that is commonly used in such applications which also acts as a transient plasticizer. White spirits are also commonly used in such compositions as a coalescing agent. Propylene glycol is sometimes utilized in such surface coating compositions in an amount ranging from about 1 percent to about 4 percent in order to increase the open time of the surface coating composition.

This invention is illustrated by the following examples which are merely for the purpose of illustration and are not to be regarded as limiting the scope of this invention or the manner in which it can be practiced. Unless specifically indicated otherwise, all parts and percentages are given by weight.

EXAMPLE 1

An aqueous reaction mixture was prepared by mixing 67 phm of styrene, 30 phm of butylacrylate, 2 phm of acrylic acid, 1 phm of methacrylic acid, 0.6 phm of tertiary-dodecyl mercaptan, 0.05 phm of sodium lauryl sulfate, 0.8 phm of ammonium persulfate and 200 phm of water in a reaction vessel. The polymerization mixture was allowed to polymerize for 1 hour at 59° C. The reaction temperature was then increased to 79° C. and the polymerization was allowed to continue for an additional 2.5 hours with a terpolymer emulsion being formed.

The terpolymer emulsion produced was then spray dried utilizing a Buchi 190 mini spray dryer. The spray dryer was operated utilizing an inlet temperature of 90° C., an outlet temperature of 57° C. and with the pump, aspirator, and heater settings being 3, 5, and 4.5, respectively. A self-emulsifiable resin powder composition was obtained by this procedure.

Reconstituted latices were prepared by simply shaking equal amounts of the powder composition prepared and water together in bottles. The water utilized in this procedure had a pH of 9–10 which was attained by the addition of ammonia. The 50 percent solids latex formed was very stable and after 12 months of standing did not show any signs of destabilization.

EXAMPLE 2 (COMPARATIVE)

The procedure utilized in Example 1 was repeated in this experiment except that no sodium lauryl sulfate was included in the reaction mixture. In this experiment the powder composition produced could not be reconstituted to form a stable latex. In fact, after the resin powder composition was dispersed in the water phase separation occurred very quickly upon standing.

EXAMPLE 3

The reconstituted latex prepared in Example 1 was utilized in making a white paint. This paint was prepared by mixing 100 parts of the resin powder composition made in Example 1 with 100 parts of water, 1 part of Surfinol TM 104 (a wetting agent and antifoam agent), 10 parts of propylene glycol, 5 parts of an amine, 10 parts of butyldiglycol, 8 parts of Plastilit TM (a plasticizer), 12.5 parts of white spirits, and 80 parts of titanium dioxide (a white pigment). This paint was prepared with only a moderate amount of agitation being required. In fact, much less mechanical agitation was required in preparing this paint than is normally required using conventional latices in making paints.

The white paint made in this experiment exhibited excellent adhesion to steel and aluminum. This paint was also determined to provide a copper plate with excellent protection against oxidation. More specifically, copper surfaces which have been painted utilizing this paint do not quickly turn blue due to oxidation as do copper surfaces which have been painted using conventional water borne paint formulations.

While certain representative embodiments have been shown for the purpose of illustrating the invention, it will be apparent to those skilled in this art that various changes and modifications can be made therein without departing from the scope of the invention.

What is claimed is:

1. A process for dispersing a self-emulsifiable resin powder composition in water comprising:
    (a) adjusting the pH of said water to greater than 7;
    (b) mixing said self-emulsifiable resin powder composition into the water to form a redispersed latex wherein said self-emulsifiable resin powder composition is comprised of (1) a terpolymer comprised of repeat units derived from about 0.1 to 6 weight percent acrylic acid, (2) about 0.1 to 4 weight percent methacrylic acid, and (3) about 93 to 99 weight percent copolymerizable monomers, with the proviso that the total amount of repeat units derived from acrylic acid, methacrylic acid, and other carboxyl group containing monomers in said terpolymer does not exceed 7 weight percent, said weight percentages being based upon the total weight of said terpolymer; and
    (c) from 0.005 to 1 weight percent, based upon the total weight of said powder composition, of at least one member selected from the group consisting of metal salts of alkyl sulfates and metal salts of alkyl sulfonates.

* * * * *